UNITED STATES PATENT OFFICE.

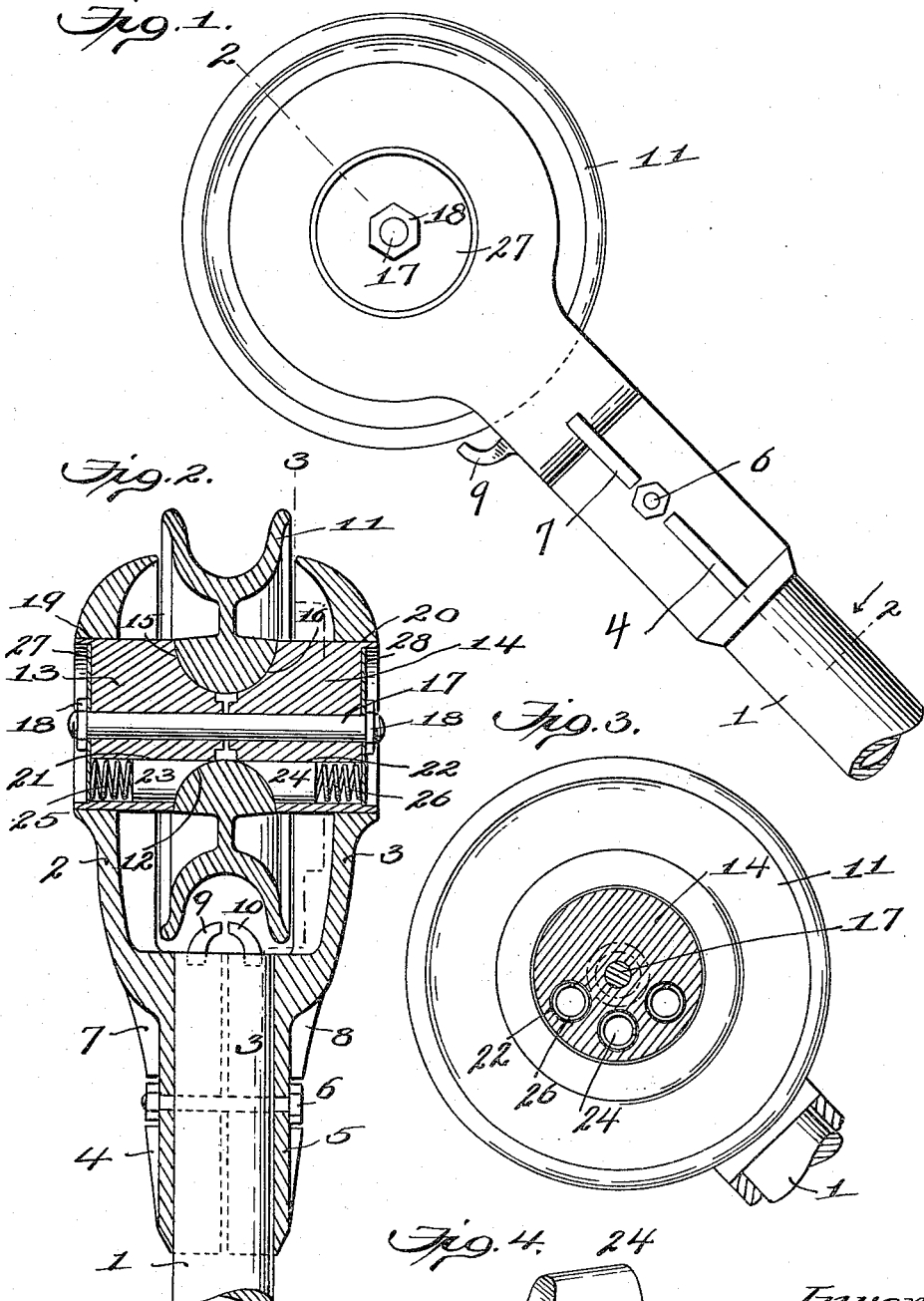

CHARLES M. FEIST, OF SIOUX CITY, IOWA.

BEARING FOR WHEELS.

1,172,965.  Specification of Letters Patent.  Patented Feb. 22, 1916.

Application filed December 31, 1914. Serial No. 879,876.

*To all whom it may concern:*

Be it known that I, CHARLES M. FEIST, a citizen of the United States, residing at Sioux City, in the county of Woodbury and State of Iowa, have invented new and useful Improvements in Bearings for Wheels, of which the following is a specification.

My present invention relates to improvements in bearings for wheels and the like and more especially for trolley wheels, and the primary objects of the invention are to provide a bearing wherein the bearing surfaces will fit accurately, to provide improved means for maintaining efficient lubrication of the bearing surfaces, and to provide efficient electrical contact between the wheel and its supporting axle, particularly when the invention is applied to trolley wheels, the lubricating means acting in a manner which will not interfere with the electrical contact between the wheel and its axle.

To these and other ends, the invention consists in certain improvements, and combinations and arrangements of parts, all as will be hereinafter more fully described, the novel features being pointed out particularly in the claims at the end of the specification.

In the accompanying drawing: Figure 1 is a side elevation showing a trolley wheel and harp constructed in accordance with the present invention; Fig. 2 represents a section through the trolley wheel and harp on the line 2—2 of Fig. 1; Fig. 3 represents a section on the line 3—3 of Fig. 2; Fig. 4 is a detail perspective view of one of the lubricating mediums.

Similar parts are designated by the same reference characters in the several views.

Certain features of the present invention are applicable to bearings for wheels and other revoluble parts. The present invention possesses particular advantages as applied to trolley wheels, as it insures good electrical contact between the wheel and the harp and long service by reason of the efficient lubricating arrangement which it affords.

While the invention is shown in the accompanying drawing and will be hereinafter described in detail as applied to a trolley wheel, it will be understood that the invention is not necessarily restricted to that particular use nor to the precise construction shown, as equivalent uses and constructions may be employed which will be within the scope of the claims at the end of the specification.

In the present instance, 1 designates the upper end of an ordinary trolley pole on which a harp and trolley wheel are mounted. The harp in the present instance comprises a pair of sections 2 and 3 which are preferably duplicates, as shown, and form halves of the harp, these half sections having semi-circular shanks 4 and 5 which are adapted to fit around the upper end of the trolley pole and to be clamped or secured thereon by a bolt or equivalent device 6. In order to prevent catching of the trolley wire upon the heads or nuts of the bolt, ribs 7 and 8 are preferably formed on the outer sides of the sections and serve to deflect the trolley wire past the bolt heads or nuts should the trolley wheel for any reason leave the trolley wire, thereby avoiding damage to the trolley wire or overhead electrical construction. The respective halves of the harp are also preferably provided with semi-loop sections 9 and 10 which, when the harp sections are united, form a loop or eye for the attachment of the usual trolley rope. The upper portion of the harp is recessed to receive the grooved trolley wheel 11 and, according to the present invention, the hub of the trolley wheel is formed interiorly with a curved bearing surface 12 which is preferably semi-cylindrical in cross-section. The axle for the wheel, according to the present invention, embodies a pair of alined sections 13 and 14 which may be duplicates, the inner ends of the axle sections being formed with curved bearing surfaces 15 and 16 which are complemental to the bearing surface 12 within the hub of the wheel, the bearing surfaces 15 and 16 of the axle sections being in the present instance in the form of quarter circles, and when the axle sections are assembled and brought into engagement with the opposite sides of the wheel hub, the bearing surfaces 15 and 16 thereon coöperate with and fit closely to the curved bearing surface 12 within the wheel hub. The axle sections are maintained in correct adjustment relatively to the wheel by suitable means such, for example, as a bolt 17 which, in the present instance, extends axially through the axle sections and is provided at its ends with nuts 18 which serve to adjustably hold the axle sections in operative position. The axle sections are preferably secured or fitted into openings 19 and 20 formed in the respective harp sections 2 and 3. These openings in the harp sections leave the ends of the axle sections accessible.

In order to provide efficient lubrication for the bearing surfaces 12, 15 and 16, the axle sections are provided with bores or chambers 21 and 22 of a suitable number and which extend from the outer ends of these axle sections to the bearing surfaces 15 and 16, these bores or chambers being adapted to contain suitable lubricating mediums. In the present instance, plugs 23 and 24 of graphite or other appropriate lubricating substances are fitted into the bores or chambers 21 and 22 and may be held in engagement with the curved bearing surface 12 within the hub of the wheel by springs 25 and 26 which bear against their rear ends.

In order to maintain the springs 25 and 26 under compression to feed the lubricating plugs 23 and 24 against the bearing surface 12 and to render the lubricating plugs accessible for occasional renewal or adjustment, disks or washers 27 and 28 are fitted against the ends of the axle sections 13 and 14 and are detachably held in place by the nuts 18, these disks or washers normally closing the outer ends of the bores or chambers 21 and 22 which contain the lubricating plugs, but the latter may be readily reached by removing either or both of these nuts and then detaching the disks or washers. In order to avoid contact of the trolley wire with the nuts 18 or the projecting ends of the bolt 17, the outer ends of the axle sections are counterbored to receive the disks and the nuts on the ends of the bolt 17, the outer ends of the bolt and the nuts thereon being substantially flush with the outer sides of the harp. The bores or chambers 21 and 22 which contain the lubricating mediums are preferably located at that side of the axle sections opposite to the side where the wheel engages the trolley wire, thus avoiding reduction in area of the bearing surfaces 15 and 16 at the points where these bearing surfaces receive the pressure from the trolley wheel in consequence of the latter being pressed or held against the trolley wire, thereby providing the maximum surface of contact for conducting the current from the trolley wheel to the axle.

I claim as my invention:—

1. A bearing for wheels comprising an axle embodying alined axially adjustable sections having curved bearing surfaces on their adjacent ends to coöperate with a similarly curved bearing surface formed interiorly of the wheel, and lubricating plugs movable axially against the bearing surface of the wheel.

2. The combination of a wheel having its hub formed with a transversely convexed surface, an axle comprising alined axially adjustable section having concave bearing surfaces coöperative with said bearing surface of the wheel, and lubricating devices in the respective axle sections and movable axially against the bearing surface of the wheel.

3. The combination with a mounting and a wheel having an interior convex bearing surface, of an axle comprising sections having complemental concave bearing surfaces coöperating with opposite sides of said interior convex bearing surface said axle sections being removable from the opposite outer sides of said mounting, and lubricating devices arranged axially in the respective axle sections.

4. The combination with a wheel having an interior convex bearing surface, of an axle comprising sections having complemental concave bearing surfaces coöperating with opposite sides of said interior convex bearing surface, and axially movable lubricating plugs in the adjacent ends of the axle sections.

5. The combination with a mounting having alined bores in opposite sides thereof and a wheel having an interior convex bearing surface, of an axle comprising sections having complemental concave bearing surfaces coöperating with opposite sides of said interior convex bearing surface, said axle sections being fitted into and removable from the outer ends of the bores in said mounting, and axially movable lubricating plugs arranged in the inner ends of the axle sections and accessible from the outer ends of said axle sections.

6. The combination with a mounting and a wheel having an interior convex bearing surface, of an axle comprising sections having complemental concave bearing surfaces coöperating with opposite sides of said interior convex bearing surface, said axle sections being removable from the opposite outer sides of said mounting and means extending axially through the axle sections and detachably and adjustably holding them in coöperative relation with the interior bearing surface of the wheel.

7. Lubricating means for the bearing surfaces between relatively fixed and revoluble parts comprising lubricating plugs located at one side only of the relatively fixed part and operative to apply a lubricant to the bearing surface of the revoluble part, said lubricating plugs being accessible for insertion or removal while said parts are in operative relation.

8. The combination with a wheel having an interior convex bearing surface, an axle comprising sections having complemental bearing surfaces coöperative with opposite sides of the bearing surface of said wheel, said axle sections being chambered longitudinally, and lubricating mediums contained in said chambers and coöperating with the bearing surface of the wheel.

9. The combination with a wheel having an interior convex bearing surface, an axle comprising sections having complemental bearing surfaces coöperative with opposite sides of the bearing surface of said wheel, said axle sections being chambered longitudinally, and lubricating mediums contained in said chambers and coöperating with the bearing surface of the wheel, said lubricating mediums being accessible from the respective ends of the axle sections.

10. The combination with a wheel having an interior convex bearing surface, an axle comprising sections having complemental bearing surfaces coöperative with opposite sides of the bearing surface of said wheel, said axle sections being chambered longitudinally, lubricating plugs in the chambers of the axle sections and coöperating at their inner ends with the bearing surface of the wheel, springs at the outer ends of the plugs and acting thereon, and detachable disks at the ends of the axle sections and normally holding said springs in position.

11. The combination with a trolley harp having alined bores in opposite sides thereof, of axle sections fitted into the respective bores and having at their inner ends complemental concaved bearing surfaces, a wheel having a convex interior bearing surface coöperating with the concave bearing surfaces at the inner ends of the axle sections, and lubricating plugs in the axle sections accessible for insertion or removal from the outer ends of such axle sections.

In testimony whereof I have hereunto set my hand in presence of two subscribing witnesses.

CHARLES M. FEIST.

Witnesses:
M. L. SLOAN,
DOROTHY DE BEER.

Copies of this patent may be obtained for five cents each, by addressing the "Commissioner of Patents, Washington, D. C."